May 26, 1936.  L. C. BIRD ET AL  2,042,383
PROPORTIONAL LIQUID FEED APPARATUS
Filed July 10, 1935
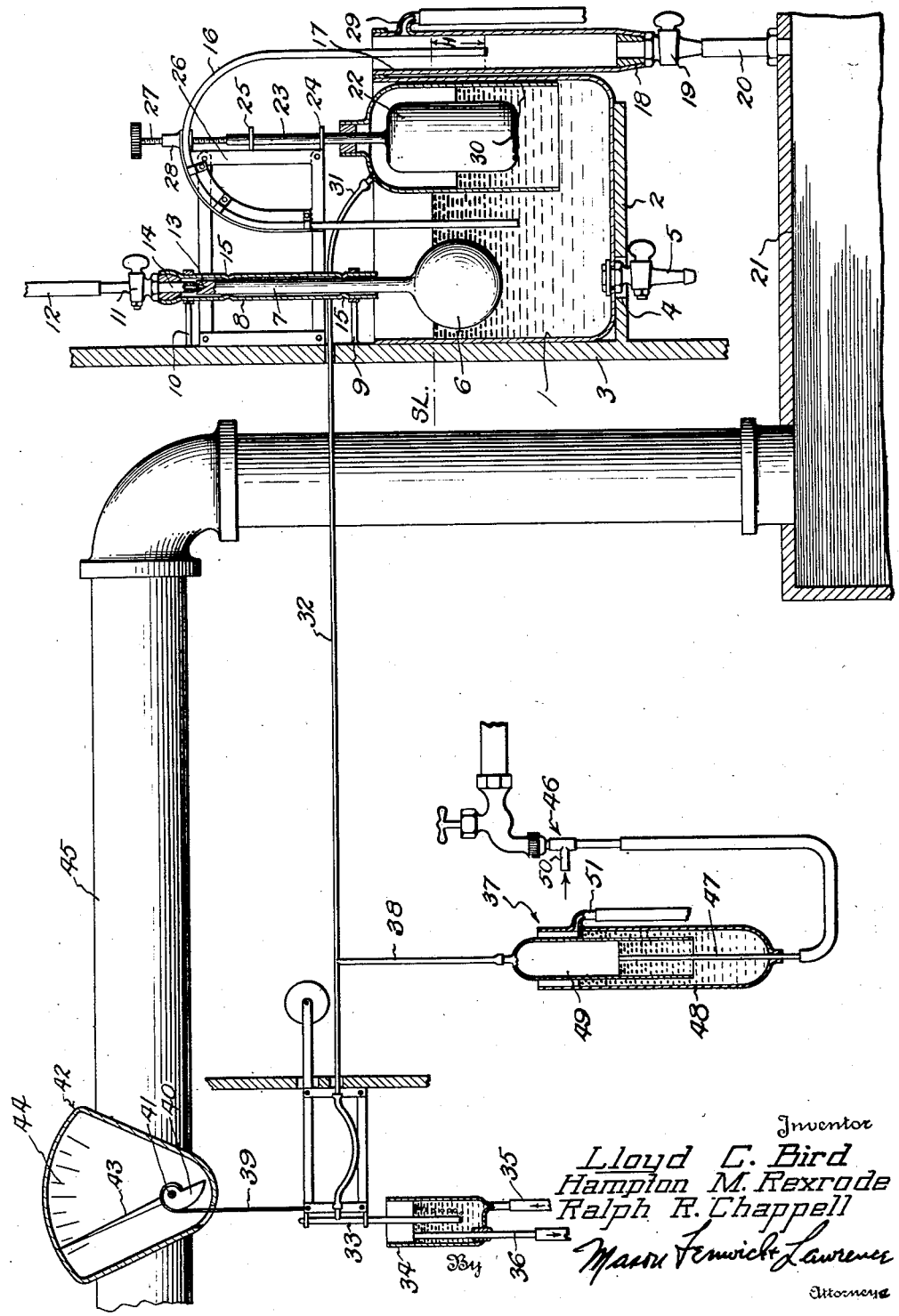
Inventor
Lloyd C. Bird
Hampton M. Rexrode
Ralph R. Chappell Patented May 26, 1936

2,042,383

UNITED STATES PATENT OFFICE 2,042,383

PROPORTIONAL LIQUID FEED APPARATUS

Lloyd C. Bird, Hampton M. Rexrode, and Ralph R. Chappell, Richmond, Va., assignors to Phipps & Bird, Inc., Richmond, Va., a corporation of Virginia Application July 10, 1935, Serial No. 30,690

4 Claims. (Cl. 137—165)

The invention forming the subject matter of this application is in the nature of an improvement on the constant liquid feed apparatus disclosed in United States Patent No. 1,970,880, August 21, 1934.

The main object of the invention is to provide an apparatus of the character described which imposes a control upon the patented constant feed apparatus so as to adapt that apparatus for supplying treating fluid in proportion to varying demands therefor.

Other objects of the invention will become apparent as the detailed description thereof proceeds.

The drawing is a diagrammatic layout of the apparatus comprised in the present invention, parts thereof being shown in section and parts in elevation to illustrate the principle involved.

As shown in the drawing, the liquid feed apparatus comprises a tank 1 suitably supported on a shelf 2 extending from a substantially vertical wall 3. The shelf 2 is provided with an aperture 4 through which extends a discharge faucet 5 connected to the bottom of the tank substantially as shown in the drawing. In the tank 1 the treating liquid is maintained at a constant level by means of the float 6 having a stem 7 extending upwardly therefrom to slide through a tube 8, suitably secured to the wall 3 by brackets 9 and 10. The tube 8 is connected at its upper end to a valve 11 connected by a pipe 12 to solution tanks (not shown).

The upper end of the stem 7 is provided with a seat 13 adapted to close the lower end of a pipe 14 extending from the valve 11 coaxial with the axis of the stem 7. It will be obvious from the drawing that so long as the valve 11 is open, liquid will flow through the pipe 14 and around the stem 7 into the tank 1; and, that this condition of flow will continue until the liquid in the tank arrives at the solution level SL, which of course, will depend upon the length of the stem and the position of closure between the upper end of the stem 7 and the pipe 14. A series of indentations 15 spaced apart angularly around the pipe 8 keeps the stem 7 always centered in the pipe 8, and permits the liquid to flow freely around said stem.

A syphon 16 controls the flow of liquid from the feeder tank 1 into the vessel 17 which is suitably secured in fixed position relative to the tank 1; and this vessel 17 is provided at its lower end with an outlet 18 controlled by a faucet 19 which, in turn, is connected by piping 20 to a tank 21 containing the material to be treated by the treating solution.

The position of the syphon to vary the head H, is determined by a float 22 supported by the liquid in the tank 1. This float 22 has a stem 23 extending upwardly therefrom and through guide sleeves 24 and 25 connected to the outer member 26 of a parallelogram linkage fixed at one end to the wall 1 substantially as described and shown in my aforesaid patent. An adjusting screw 27 extends through a screwthreaded boss 28 in the outer member 26, with its lower end in contact with the upper end of the stem 23. It will be obvious that as the screw 27 is adjusted, the syphon will be correspondingly raised or lowered relative to the float 22, with the parallelogram linkage maintaining the legs of the syphon constantly vertical in the manner disclosed in the aforesaid patent.

The overflow 29 for the feeder tank is located at the upper end of the vessel 17; and is designed to discharge treating solution to waste, should the level control valve in the tank 1 fail, and allow the level of solution in the tank to rise higher than the upper end of overflow 29. The liquid thus discharged to waste must, in this case pass through the syphon.

To vary rate of flow in proportion to the demand for solution, the float 22 is located within a bell 30, attached at its upper end to the stem 23. It is evident that when the float is surrounded by the bell 30, in the manner shown in the drawing, that it is possible, by increasing and decreasing air pressure in the bell, to change the buoyancy of the float in such manner as to cause the float to assume positions of equilibrium with more or less of its depth immersed in the solution of the tank. When the air pressure under the bell is high, the float will, of course, be correspondingly raised until the weight of the float above the solution counterbalances the upward force generated by the air pressure within the bell.

It will be evident from inspection of the drawing, that by varying the air pressure under the bell 5, the position of the float relative to the solution level in the tank, can be changed, and therefore that the head H of the syphon can be correspondingly changed. When this change takes place, the rate of flow of solution through the syphon is also changed. As pressure increases under the bell, the float tends to rise and the head H tends to decrease. Increasing pressures under the bell, therefore, cuase the syphon to deliver treating solution at slower and different rates. Decreasing the pressure under the bell has the opposite effect.

It will be apparent that any device which will change the air pressure under the bell in proportion to the flow of material to be treated by the solution from the feeder, will cause the solution to be delivered from the feeder syphon as the demand for treatment varies. To take a concrete case, any device attached to flow meter capable of varying the pressure under the bell with respect to the sewage flow into a treatment plant, would cause the float level to rise and fall in proportion to this variation in pressure, and thereby deliver such material as ferric chloride solution into the incoming sewage in proportion to the amount of material required for the rate indicated by the flow meter.

In order to effect control of pressure under the bell 30, the latter is connected by a flexible tube 31 to a pipe line 32, which in turn, is connected to a tube 33 closed at its upper end and having a lower open end immersed in a constant level cell 34 provided with water through an inlet 35. The level of water in the cell 34 is determined by the distance through which an overflow pipe 36 is projected above the bottom of the aforesaid cell. The source of air pressure designated generally by the reference numeral 37, is connected by a pipe 38 to the line 32 to furnish air to it until the pressure built up in the bell 30 and the tube 33 is sufficient to cause bubbles to break from the immersed open end of the tube 33. When this condition obtains, the pressure will not build up any further, but will remain fixed until the depth of immersion of the tube 33 is changed.

In the present instance, the liquid level in the cell 34 is maintained constant and the variation in pressure is secured by varying the depth of immersion of the tube 33 in the cell. It will be apparent that as the depth of the tube 33 is increased in the water contained in the cell 34, the pressure pumped into the line 32 by the source 37 of compressed air, is increased, thereby causing an increase in the pressure under the bell 30, and causing the float 22 to rise to a higher level relative to the solution level SL. The elevation of the float raises the syphon and decreases the head H and causes the flow through the feeder to decrease. In other words, as the depth of immersion of the tube 33 in the cell 34 increases, the flow through the feeder decreases; and vice versa.

It will be apparent that to control the flow to the point of application of any solution passing through the feeder tank 1, it is only necessary to use some form of flow metering device to vary the depth of immersion of the tube 33 in the cell 34. As shown in the drawing, the tube 33 is mounted on the outer member of a counterbalanced parallel linkage, which is raised and lowered by a flexible connection 39 secured at one end to the free end of the linkage. At its other end the connection 39 is fixed to a cam 40 on the shaft 41 of a flow meter 42 having an indicator 43 movable over a scale 44 on which the rate of flow of material to be treated through the piping 45, is indicated. The cam 40 may be shaped so as to control the delivery of solution to the point of application at any rate within the capacity of the feeder. This cam 40 may be necessary to equalize either the variations in rotation of the shaft 41 in response to varying flow, or the peculiarity in response to the feed rate of the syphon with respect to the change in the operating head H. The invention is not particularly concerned with the type of flow meter to be used in the system, since it is intended that the apparatus will be hooked up to existing flow meters.

Any suitable type of air pump device capable of delivering small quantities of air at low pressure, can be used to operate the apparatus disclosed herein. Where it is desirable to avoid the use of motor driven devices, the compressor mechanism shown in the drawing may be used. In this case the compressor consists of a common aspirator 46 suitably connected to a pipe 27 extending up through the bottom of a tube 48 into a bell 49 supported coaxially within the tube 48.

Water flowing through the aspirator 46 entrains air through the air inlet pipe 50, and discharges it under the bell 49 and above the upper end of pipe 47. The water discharged from pipe 47 is trapped in tube 48 and flows to waste through the discharge outlet 51 near the upper end of tube 48. The water in tube 48 seals the lower end of bell 49, and operates, by tending to raise the water level in tube 48 to the level of outlet 51, as a pump to force the air under pressure in bell 49 into the control system of the feeder.

It will be apparent that the device disclosed herein varies the rate of flow through a solution feeder, in response to changes in the flow of the material to be treated by the solution. Furthermore, it will be noted that the principle of maintaining constancy of flow at any given air pressure within the bell by means of a floating siphon is not altered. Variations in feeding tank level will still cause the same rise and fall of the float with the bell attached that it would cause in a float without a bell and therefore variations in feeding tank level are prevented from affecting the rate of flow as measured by the head H in exactly the same fashion as that outlined in the previous feeder described in the patent aforesaid.

Having thus described our invention, what we claim is:

1. A conduit through which flows material to be treated, a device for feeding treating liquid to said conduit, a flow meter connected to said conduit, an air compressor connected to said device to feed air under pressure thereto, and means adjustable by said meter for varying said pressure in proportion to the rate of flow of said material to effect variations in the feed of said liquid in proportion to the said rate of flow.

2. A conduit through which flows material to be treated, a device including a vertically adjustable syphon for feeding treating liquid to said conduit, an air compressor connected to said device to vary the rate of feed of said liquid, a flow meter connected to said conduit and operated by and in accordance with the rate of flow of said material through said conduit to vary said air pressure in proportion to the said rate of flow, and means for adjusting the syphon to vary said rate of feed independently of said meter and compressor.

3. A conduit through which flows material to be treated, a tank, means for maintaining a substantially constant liquid level in the tank, a vessel in fixed relation to said tank and having a discharge outlet below said liquid level, a syphon vertically movable relative to said tank and vessel and having its legs depending therein respectively, a float in the tank, means for adjustably supporting the syphon on the float to vary the rate of feed of liquid from said tank to the conduit, and means controlled by the rate of flow of said material for independently adjusting said syphon to vary the rate of feed of treating liquid to said conduit.

4. A conduit through which flows material to be treated, a tank, means for maintaining a substantially constant liquid level in the tank, a vessel in fixed relation to the tank and having a discharge outlet connected to said conduit, a syphon vertically movable relative to said tank and vessel and having its legs depending therein, respectively, a float in the tank, means for adjusting the syphon on said float to vary the rate of feed of liquid from said tank to the conduit, a bell encompassing and secured to said float, a source of air under pressure connected to said bell, and means controlled by the flow of material in said conduit to vary said air pressure and hence vary the rate of feed of said liquid independently of said adjusting means and proportional to the rate of flow of said material.

LLOYD C. BIRD.
HAMPTON M. REXRODE.
RALPH R. CHAPPELL.